(12) United States Patent
Iemura

(10) Patent No.: US 6,483,883 B1
(45) Date of Patent: Nov. 19, 2002

(54) AUTOMATIC GAIN CONTROL TYPE DEMODULATION APPARATUS HAVING SINGLE AUTOMATIC GAIN CONTROL CIRCUIT

(75) Inventor: Takaya Iemura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/314,906

(22) Filed: May 20, 1999

(30) Foreign Application Priority Data

May 20, 1998 (JP) .......................................... 10-138921

(51) Int. Cl.$^7$ ............................................ H04L 27/227
(52) U.S. Cl. ...................... 375/345; 375/329; 370/204
(58) Field of Search ................................ 370/203, 204, 370/208, 215, 335, 342, 483; 375/345, 329, 334, 261, 268, 272, 279, 324; 329/300, 304

(56) References Cited

U.S. PATENT DOCUMENTS

| | | | | |
|---|---|---|---|---|
| 5,276,685 A | * | 1/1994 | Kepler et al. ................ | 375/345 |
| 5,347,569 A | * | 9/1994 | Yamamoto ................... | 375/345 |
| 5,745,531 A | * | 4/1998 | Sawahashi et al. .......... | 375/345 |
| 5,805,241 A | * | 9/1998 | Limberg ...................... | 375/345 |
| 5,940,451 A | * | 8/1999 | Kim ............................ | 375/331 |
| 6,160,838 A | * | 12/2000 | Shinohara et al. .......... | 375/130 |

FOREIGN PATENT DOCUMENTS

| | | |
|---|---|---|
| JP | 6-152676 | 5/1994 |
| JP | 8-181730 | 7/1996 |
| JP | 9-8766 | 1/1997 |
| JP | 9-247113 | 9/1997 |
| JP | 9-247228 | 9/1997 |
| JP | 3097605 | 8/2000 |

OTHER PUBLICATIONS

Japanese Office Action issued Jan. 30, 2001 in a related application with English translation of relevant portions.

* cited by examiner

Primary Examiner—Hassan Kizuo
Assistant Examiner—David Odland
(74) Attorney, Agent, or Firm—Dickstein, Shapiro, Morin & Oshinsky, LLP.

(57) ABSTRACT

In an automatic gain control type demodulation apparatus, an orthogonal demodulation circuit receives an analog input signal to generate a first I-signal and a second Q-signal orthogonal to each other. An analog/digital converter circuit performs an analog/digital conversion operation upon the first I-signal and the first Q-signal to generate a second I-signal and a second Q-signal. An automatic gain control (AGC) circuit suppresses amplitude errors of the second I-signal and the second Q-signal to generate a third I-signal and a third Q-signal. A complex multiplier removes frequency and phase offset components of a carrier wave included in the third I-signal and the third Q-signal to generate a fourth I-signal and a fourth Q-signal. A phase detector detects first and second amplitude errors of the fourth I-signal and the fourth Q-signal, respectively, with respect to one normal signal point and calculates a phase error of the fourth I-signal and the fourth Q-signal. A numerical control oscillator converts the phase error into first and second angle signals orthogonal to each other. The AGC circuit controls the amplitude errors of the second I-signal and the second Q-signal in accordance with the first and second amplitude errors and the first and second angle signals.

15 Claims, 12 Drawing Sheets

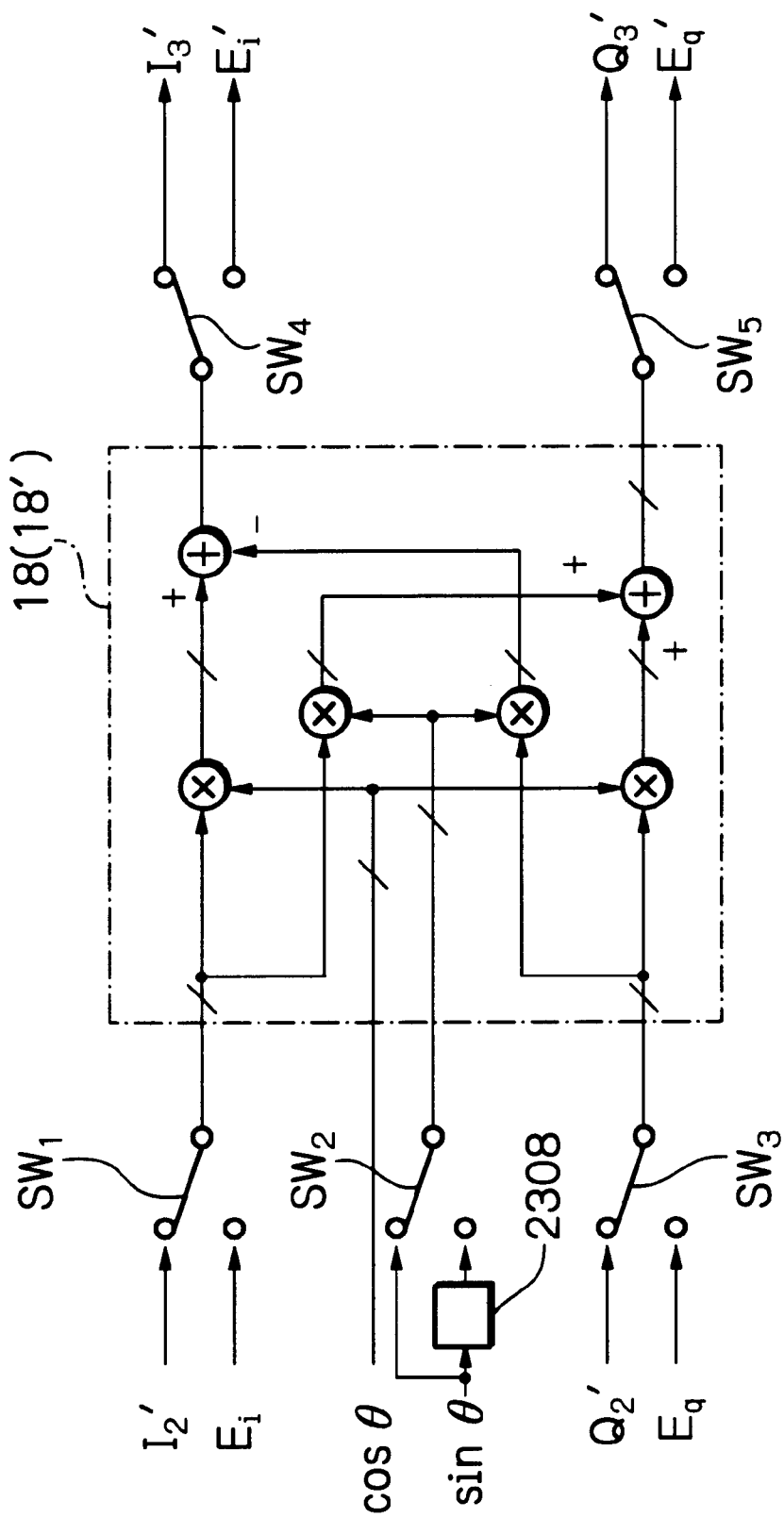

US 6,483,883 B1

AUTOMATIC GAIN CONTROL TYPE DEMODULATION APPARATUS HAVING SINGLE AUTOMATIC GAIN CONTROL CIRCUIT

BACKGROUND OF THE INVENTION

1. Field of the Invention

The present invention relates to an automatic gain control (AGC) type demodulation apparatus in a digital radio communication system.

2. Description of the Related Art

A prior art AGC type demodulation apparatus is generally constructed by an orthogonal demodulation circuit for receiving an analog input signal to generate a first I-signal (I-axis component or I-channel) and a first Q-signal (Q-axis component or Q-channel) orthogonal to each other. An analog/digital (A/D) converter circuit performs an A/D conversion operation upon the first I-signal and the first Q-signal to generate a second I-signal and a second Q-signal. A first AGC circuit suppresses the difference in amplitude between the second I-signal and the second Q-signal to generate a third I-signal and a third Q-signal. A complex multiplier rotates the third I-signal and the third Q-signal by a phase offset angle to remove the frequency and phase offset components of a carrier wave included in the third I-signal and Q-signal to generate a fourth I-signal and a fourth Q-signal. In this case, the phase offset angle is obtained by a loop circuit formed by a phase detector, a low-pass filter and a numerical control oscillator. A second AGC circuit compensates for the difference in amplitude between the fourth I-signal and the fourth Q-signal and one normal signal point in accordance with one amplitude error of the fourth I-signal and the fourth Q-signal with respect to one normal signal point. This will be explained later in detail.

In the prior art AGC-type demodulation apparatus however, an accurate automatic gain control cannot be expected. As a result, the I-signal and Q-signal regenerated by the second AGC circuit still show a circular locus around the normal signal point. In addition, since the combination of the two AGC circuits is large in size, the AGC demodulation apparatus is increased in size.

SUMMARY OF THE INVENTION

It is an object of the present invention to provide an AGC-type demodulation apparatus capable of an accurate automatic gain control.

Another object is to decrease an AGC-type demodulation apparatus in size.

According to the present invention, in an AGC-type demodulation apparatus, an orthogonal demodulation circuit receives an analog input signal to generate a first I-signal and a first signal orthogonal to each other. An A/D converter circuit performing an A/D conversion operation upon the first I-signal and the first Q-signal to generate a second I-signal and a second Q-signal. An automatic gain control (AGC) circuit suppresses amplitude errors of the second I-signal and the second Q-signal to generate a third I-signal and a third Q-signal. A complex multiplier removes frequency and phase offset components of a carrier wave included in the third I-signal and the third Q-signal to generate a fourth I-signal and a fourth Q-signal. A phase detector detects first and second amplitude errors of the fourth I-signal and the fourth Q-signal, respectively, with respect to one normal signal point and calculates a phase error of the fourth I-signal and the fourth Q-signal. A numerical control oscillator converts the phase error into first and second angle signals orthogonal to each other. The AGC circuit controls the amplitude errors of the second I-signal and the second Q-signal in accordance with the first and second amplitude errors and the first and second angle signals. Thus, a single AGC circuit is provided in the AGC-type demodulation apparatus.

BRIEF DESCRIPTION OF THE DRAWINGS

The present invention will be more clearly understood from the description set forth below, as compared with the prior art, with reference to the accompanying drawings, wherein:

FIG. 14 is a circuit diagram where the complex multipliers of FIGS. 8 and 13 are combined into a single complex multiplier.

DESCRIPTION OF THE PREFERRED EMBODIMENTS

Before the description of the preferred embodiments, a prior art AGC-type demodulation apparatus will be explained with reference to FIGS. 1, 2A, 2B, 2C, 3, 4, 5, 6 and 7.

Figure 1:
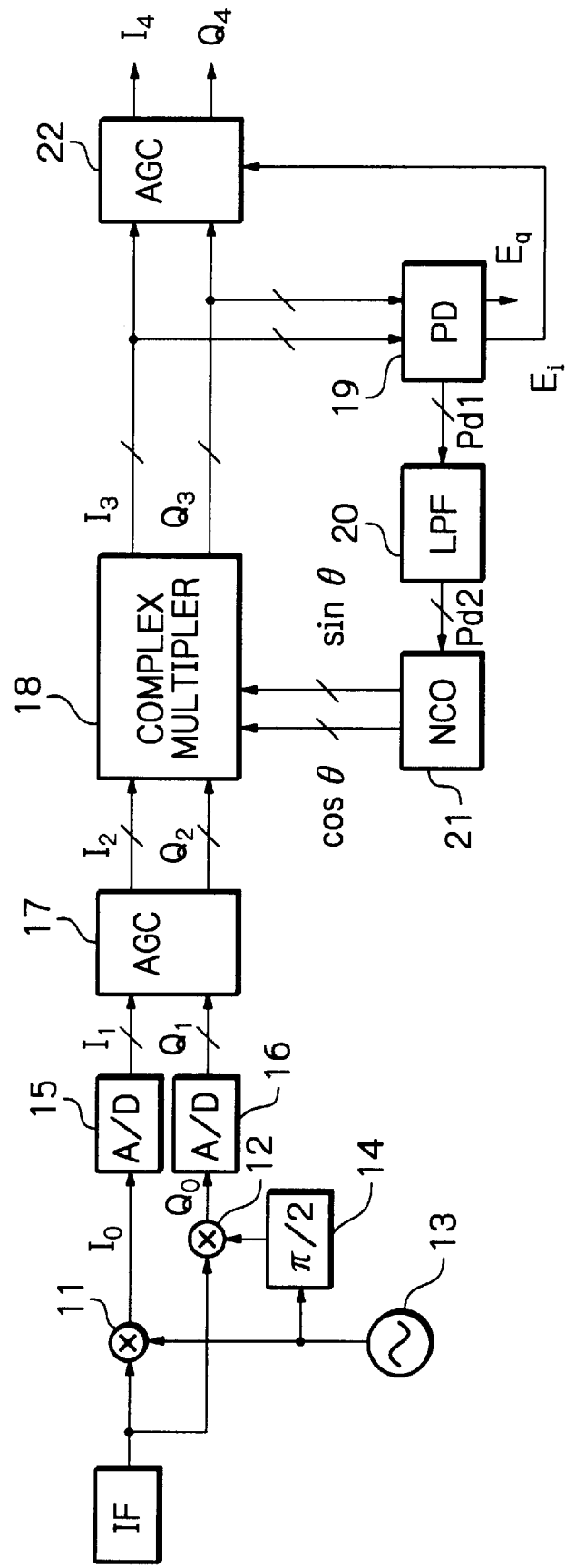
FIG. 1 is a block circuit diagram illustrating a prior art AGC-type demodulation apparatus.

In FIG. 1, an orthogonal demodulation system is semi-coherent. Also, an input modulated signal is an orthogonal modulation signal of phase shift keying (PSK) or quadrature amplitude modulation (QAM) and its orthogonal components are called an I-axis component (or I-channel) signal and a Q-axis component (Q-channel) signal.

An intermediate frequency (IF) signal is supplied from a receiver (not shown) to multipliers 11 or 12. The multiplier 11 multiplies the IF signal by a carrier wave signal from an oscillator 13, and the multiplier 12 multiplies the IF signal by a π/2-shifted carrier wave signal from a π/2 phase shifter 14 which also receives the carrier wave signal from the oscillator 13. In this case, note that the frequency of the oscillator 13 does not coincide with that of the frequency of a carrier wave included in the IF signal, so that the multipliers 11 and 12 generate semi-coherent baseband signals $I_0$ and $Q_0$, respectively.

Analog/digital converters 15 and 16 perform analog/digital conversions upon the semi-coherent baseband signals $I_0$ and $Q_0$ to generate digital signals $I_1$ and $Q_1$, respectively, which are supplied to an AGC circuit 17. The AGC circuit 17 suppresses the difference in amplitude between the signals $I_1$ and $Q_1$. That is, as indicated by a dotted line in FIG. 2A, the signals $I_1$ and $Q_1$ generally have an elliptical locus. Therefore, the AGC circuit 17 changes the elliptical locus of the signals $I_1$ and $Q_1$ to a circular locus of signals $I_2$ and $Q_2$ as indicated by a solid line in FIG. 2A. The AGC circuit 17 will be explained later in detail.

Figure 2A:
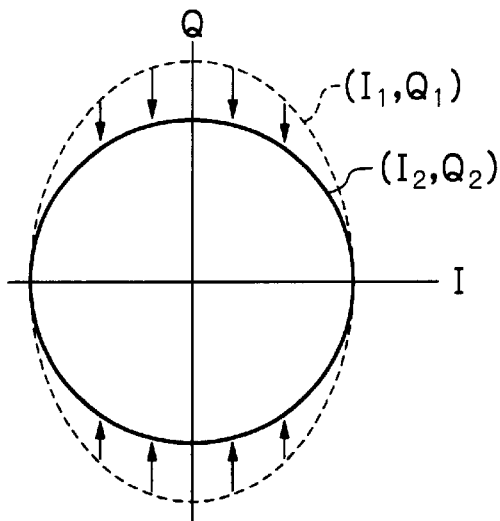
FIG. 2A is a diagram for explaining the operation of the AGC circuit 17 of FIG. 1.
Figure 2B:
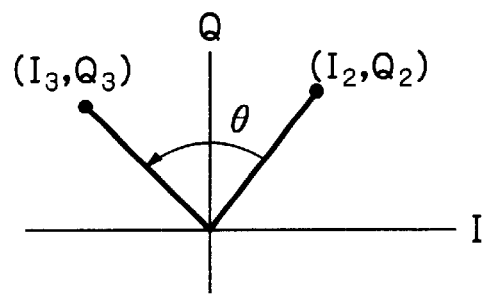
FIG. 2B is a diagram for explaining the operation of the complex multiplier of FIG. 1.

The signals $I_2$ and $Q_2$ are supplied to a complex multiplier 18 for removing the frequency and phase offset components of a carrier wave included in the signals $I_2$ and $Q_2$. The complex multiplier 18 rotates the signals $I_2$ and $Q_2$ by a phase offset angle θ to generate signals $I_3$ and $Q_3$ as shown in FIG. 2B. The phase offset angle θ is obtained by a phase detector 19, a low-pass filter 20 and a numerical control oscillator 21, which will be explained later in detail.

Figure 2C:
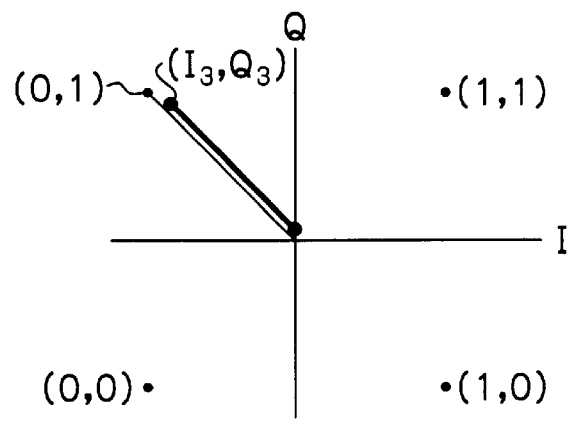
FIG. 2C is a diagram for explaining the operation of the AGC circuit 22 of FIG. 1.

The signals $I_3$ and $Q_3$ are supplied to an AGC circuit 22 for compensating for the difference in amplitude between the signals $I_3$ and $Q_3$ and one of normal signal points (0, 0), (0, 1), (1, 0) and (1, 1) as shown in FIG. 2C. Note that FIG. 2C shows a constellation of a four-phase PSK (QPSK) where four normal signal points (0, 0), (0, 1), (1, 0) and (1, 1) are illustrated. The AGC circuit 22 will be explained later in detail.

Figure 3:
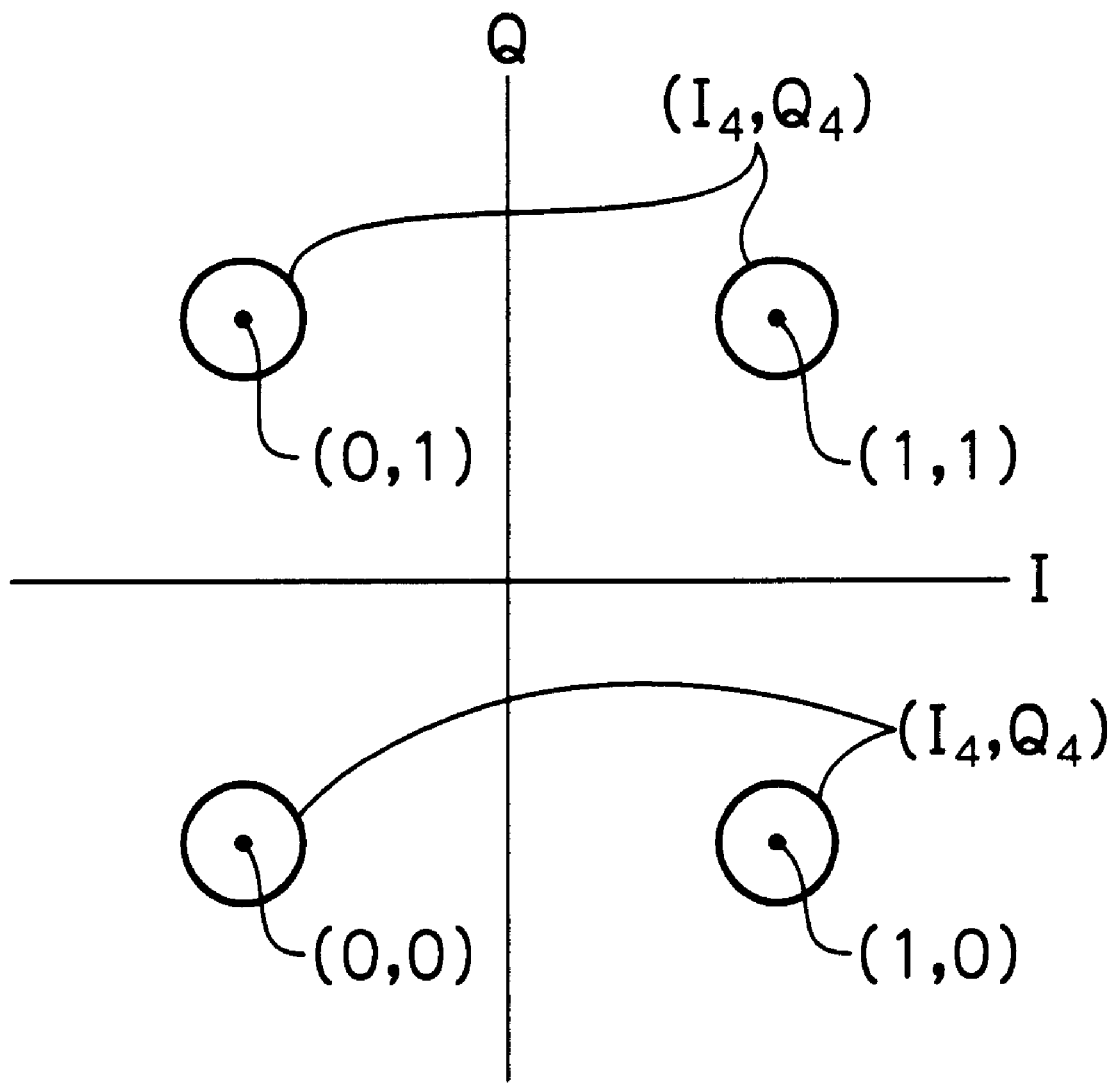
FIG. 3 is a diagram illustrating a constellation of a four-phase QPSK where the signals $I_4$ and $Q_4$ of the demodulation apparatus are illustrated.

If the AGC circuit 17 cannot completely suppress the difference in amplitude between the signals $I_1$ and $Q_1$, the signals $I_4$ and $Q_4$ output from the AGC circuit 22 may show a circular locus around one of the normal signal points (0, 0), (0, 1), (1, 0) and (1, 1) as shown in FIG. 3. In this case, the radius of the circular locus is equal to the difference in amplitude between the signals $I_2$ and $Q_2$ which is not zero.

Figure 4:
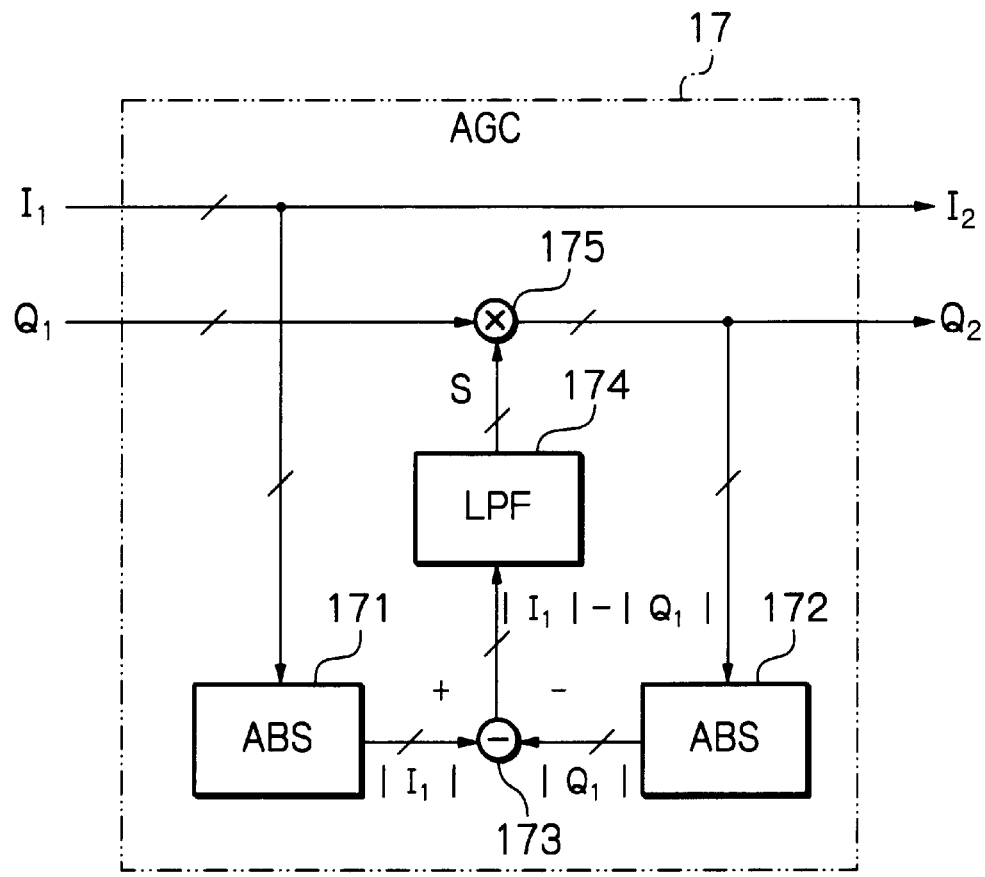
FIG. 4 is a detailed block circuit diagram of the AGC circuit 17 of FIG. 1.

In FIG. 4, which is a detailed block circuit diagram of the AGC circuit 17 of FIG. 1, an absolute calculating circuit 171 calculates an absolute value $|I_1|$ of the signal $I_1$, and an absolute calculating circuit 172 calculates an absolute value $|Q_1|$ of the signal $Q_1$. A subtracter 173 compares the absolute value $|I_1|$ with the absolute value $|Q_1|$. That is, the subtracter 173 generates an output signal showing a value $|I_1|-|Q_1|$. A low-pass filter 174 accumulates the polarity of the output signal of the subtracter 173 to generate a sum signal S. Also, a multiplier 175 multiplies the signal $Q_1$ by the sum signal S of the low-pass filter 174.

Figure 5:
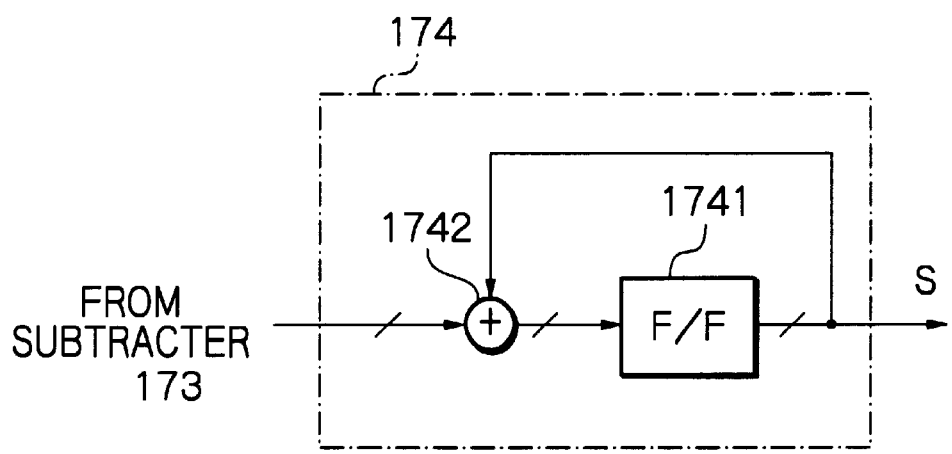
FIG. 5 is a detailed block circuit diagram of the low-pass filter of FIG. 4.

As illustrated in FIG. 5, the low-pass filter 174 is constructed by a flip-flop circuit 1741 for generating the sum signal S and an adder 1742. In this case, the adder 1742 adds the output signal of the subtracter 173 to the sum signal S of the flip-flop circuit 1741 so that the sum signal S of the adder 1742 is again stored in the flip-flop circuit 1741.

Thus, in FIG. 4, when $|I_1| \geq |Q_1|$, the value of sum signal S of the low-pass filter 174 is increased so as to increase the magnitude of the signal $Q_2$. On the other hand, when $|I_1| < |Q_1|$, the value of sum signal S of the low-pass filter 174 is decreased so as to decrease the magnitude of the signal $Q_2$. As a result, the magnitude of the signal $Q_2$ is brought close to that of the signal $I_2$ (=$I_1$).

Figure 6:
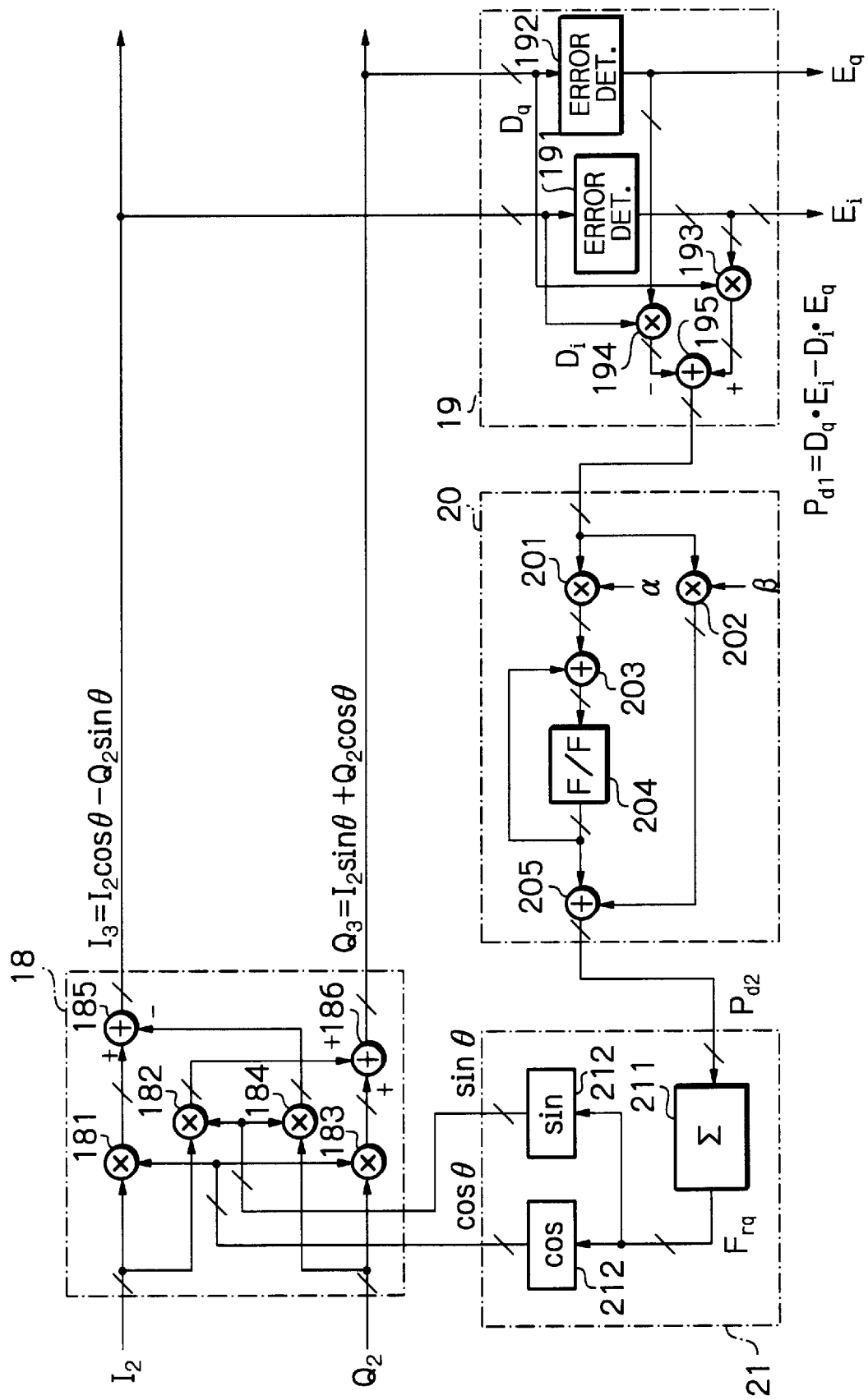
FIG. 6 is a detailed circuit diagram of the complex multiplier, the phase detector, the low-pass filter, and the numerical control oscillator of FIG. 1.

FIG. 6 is a detailed circuit diagram of the complex multiplier 18, the phase detector 19, the low-pass filter 20 and the numerical control oscillator 21.

The complex multiplier 18 receives angle signals cosθ and sinθ from the numerical control oscillator 21. The complex multiplier 18 is constructed by multipliers 181 and 182 for multiplying the signal $I_2$ by the angle signals cosθ and sinθ, respectively, and multipliers 183 and 184 for multiplying the signal $Q_2$ by the angle signals cosθ and sin θ, respectively. A subtracter 185 subtracts the output signal (=$Q_2$ sinθ) of the multiplier 184 from the output signal (=$I_2$ cosθ) of the multiplier 181 to obtain $$I_3 = I_2 \cos\theta - Q_2 \sin\theta.$$

Also, an adder 186 adds the output signal (=$Q_2$ cosθ) of the multiplier 183 to the output signal (=$I_2$ sinθ) of the multiplier 182 to obtain $$Q_3 = I_2 \sin\theta + Q_2 \cos\theta.$$

Thus, the signals $I_2$ and $Q_2$ are rotated by an angle θ to obtain the signals $I_3$ and $Q_3$.

The phase detector 19 is constructed by error detectors 191 and 192 for detecting amplitude errors of the signals $I_3$ and $Q_3$, respectively, with respect to one normal signal point, to thereby generate amplitude errors $E_i$ and $E_q$, respectively. For example, when the signal $I_3$ ($Q_3$) is shifted in a positive side from the corresponding value of the normal signal point, the amplitude error $E_i$ ($E_q$) is negative. On the other hand, when the signal $I_3$ ($Q_3$) is shifted in a negative side from the corresponding value of the normal signal point, the amplitude error $E_i$ ($E_q$) is positive. A multiplier 193 multiplies the amplitude error $E_i$ by a most significant bit (MSB) $D_q$ of the signal $Q_3$, and a multiplier 194 multiplies the amplitude error $E_q$ by a most significant bit (MSB) $D_i$ of the signal $I_3$. Then, a subtracter 195 subtracts the output signal (=$D_i \cdot E_q$) of the multiplier 194 from the output signal (=$D_q \cdot E_i$) of the multiplier 193, to obtain a phase error detection $P_{d1}$ by $$P_{d1} = D_q \cdot E_i - D_i \cdot E_q.$$

The low-pass filter 20 is generally constructed by a secondary lag lead filter which includes multipliers 201 and 202 for multiplying the phase error detection signal $P_{d1}$ by definite values α and β, respectively, an adder 203, a flip-flop circuit 204 and an adder 205. In this case, the adder 203 adds the output signal (=$\alpha \cdot P_{d1}$) of the multiplier 201 to the output signal of the flip-flop circuit 204, so that the addition result is again stored in the flip-flop circuit 204. The adder 205 adds the output signal (=$\beta \cdot P_{d1}$) of the multiplier 202 to the output signal of the flip-flop circuit 204. Thus, the low-pass filter 20 generates a phase error detection signal $P_{d2}$ by $$P_{d2} = \Sigma \alpha \cdot P_{d1} + \beta \cdot P_{d2}.$$

As a result, a carrier wave regeneration loop is formed by the complex multiplier 18, the phase detector 19, the low-pass filter 20 and the numerical control oscillator 21, so that a frequency offset can be compensated for.

The numerical control oscillator 21 is constructed by an integrator 211 for integrating the phase error detection signal $P_{d2}$ to generate a frequency error signal $F_{rq}$. The frequency error signal $F_{rq}$ is supplied to angle signal converters 212 and 213 which generate angle signals cosθ and sinθ where θ=2π$F_{rq}$.

Figure 7:
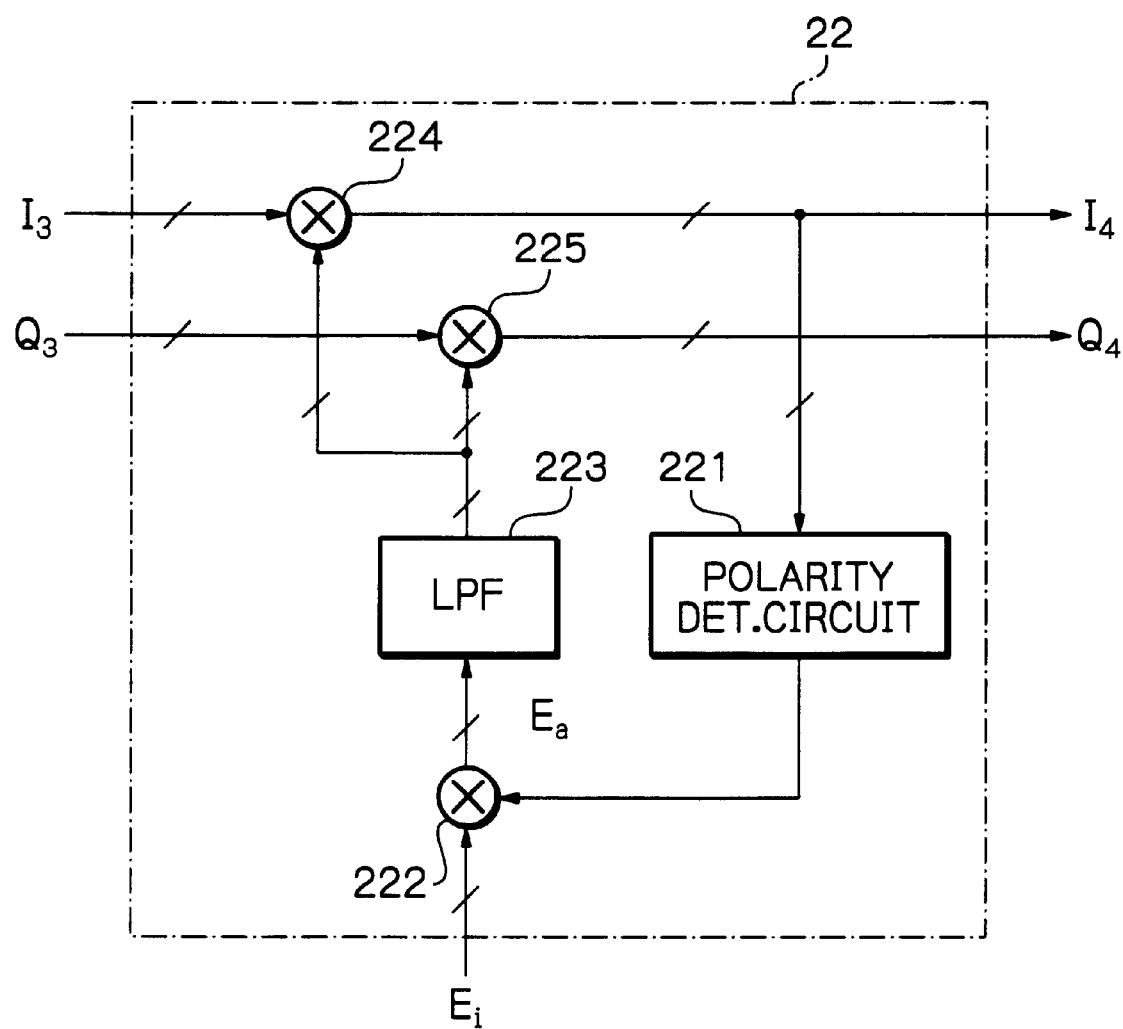
FIG. 7 is a detailed circuit diagram of the AGC circuit 72 of FIG. 1.

In FIG. 7, which is a detailed circuit diagram of the AGC circuit 22 of FIG. 1, the AGC circuit 22 is constructed by a polarity determining circuit 221 for determining the polarity of the signal $I_4$, a multiplier 222 for multiplying the error signal $E_i$ by the polarity of the signal $I_3$ to generate an amplitude error signal $E_a$, and for smoothing the amplitude error signal $E_a$. In this case, since the difference in amplitude between the signals $I_3$ and $Q_3$ is suppressed, the polarity determining circuit 221 determines only the polarity of only one of the signals $I_4$ and $Q_4$. The smoothed amplitude error signal is supplied to multipliers 224 and 225 which multiply the signals $I_3$ and $Q_3$ by the smoothed amplitude error signal.

In the AGC-type demodulation apparatus of FIG. 1, however, since the low-pass filter 174 uses only the polarity of the output signal of the subtracter 173, an accurate automatic gain control cannot be expected. As a result, the regenerated signals $I_4$ and $Q_4$ still show a circular locus around the normal signal point as shown in FIG. 3.

In addition, since the combination of the AGC circuits 17 and 22 are large in size, the AGC demodulation apparatus of FIG. 1 is increased in size.

Figure 8:
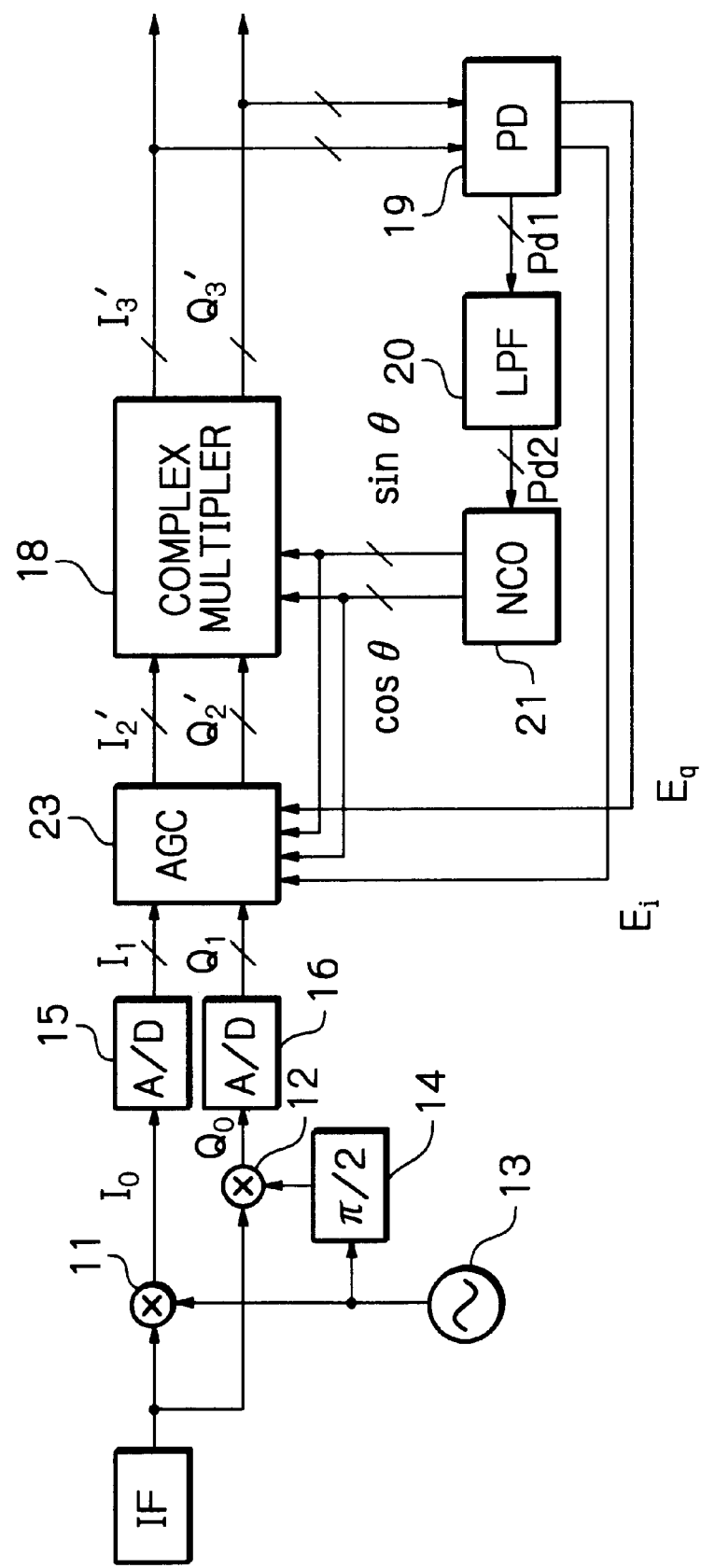
FIG. 8 is a block circuit diagram illustrating an embodiment of the AGC-type demodulation apparatus according to the present invention.
Figure 9A:
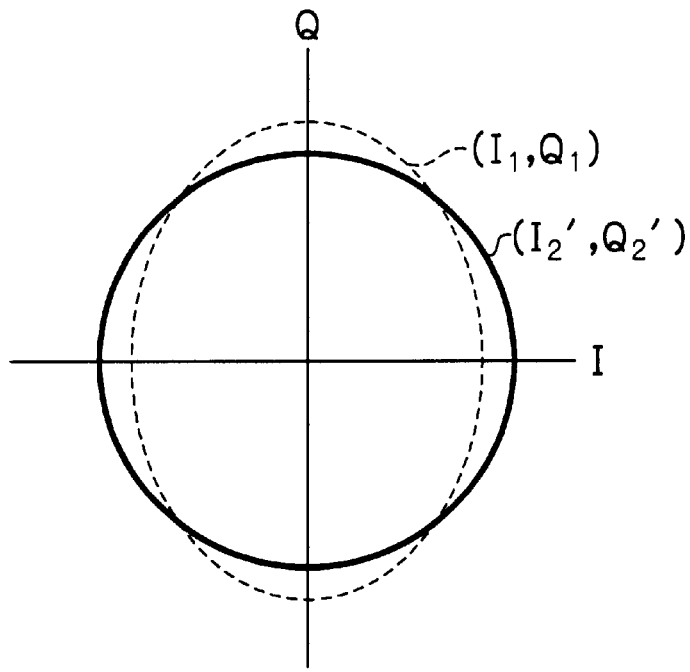
FIG. 9A is a diagram for explaining the operation of the AGC circuit of FIG. 8.
Figure 9B:
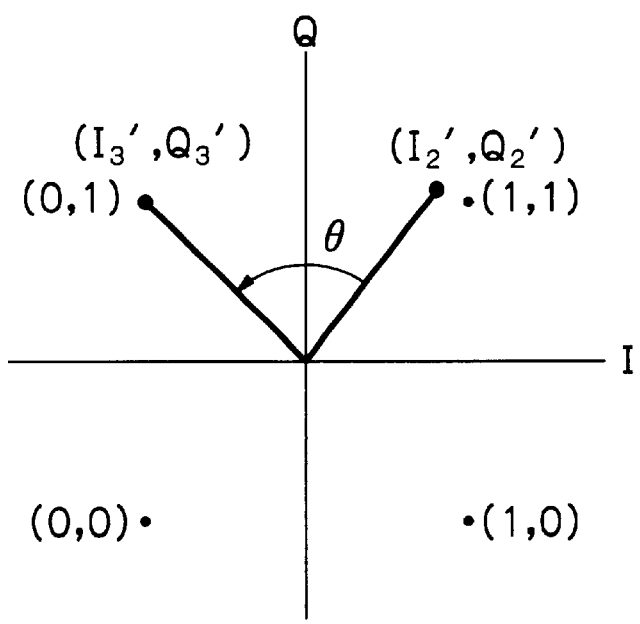
FIG. 9B is a diagram for explaining the operation of the complex multiplier of FIG. 8.

In FIG. 8, which illustrates an embodiment of the present invention, the AGC circuits 17 and 22 of FIG. 1 are combined into an AGC circuit 23 which also receives the angle signals cosθ and sinθ from the numerical control oscillator 21 as the amplitude errors $E_i$ and $E_q$ from the phase detector 19. The AGC circuit 23 suppresses the amplitude errors of the signals $I_1$ and $Q_1$ to generate signals $I_2'$ and $Q_2'$. That is, as indicated by a dotted line in FIG. 9A, the signals $I_1$ and $Q_1$ generally have an elliptical locus. Therefore, the AGC circuit 23 changes the elliptical locus of the signals $I_1$ and $Q_1$ to a circular locus of the signals $I_2'$ and $Q_2'$ as indicated by a solid line in FIG. 9A. In this case, the radius of the signals $I_2'$ and $Q_3'$ is brought close to the radius of the normal signal points (0, 0), (0, 1), (1, 0) and (1, 1) as shown in FIG. 9B. The AGC circuit 23 will be explained later in detail.

The signals $I_2'$ and $Q_2'$ are supplied to the complex multiplier 18 which rotates the signals $I_2'$ and $Q_2'$ by a phase offset angle θ to generate signals $I_3'$ and $Q_3'$ as shown in FIG. 9B. The phase offset angle θ is obtained by the phase detector 19, the low-pass filter 20 and the numerical control oscillator 21.

Figure 10:
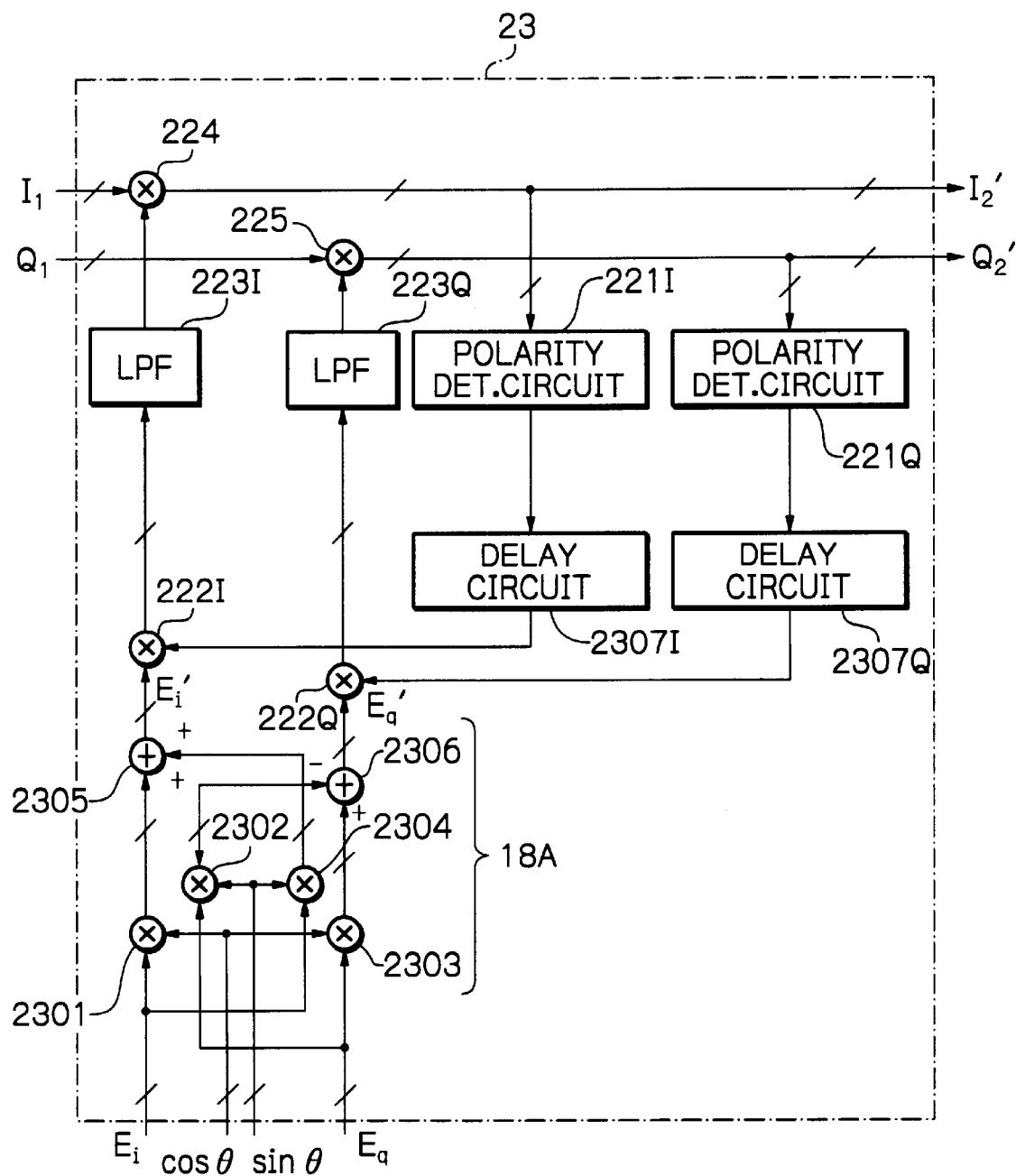
FIG. 10 is a detailed block circuit diagram of the AGC circuit of FIG. 8.

In FIG. 10, which is a detailed block circuit diagram of the AGC circuit 23 of FIG. 8, polarity determining circuits 221I and 221Q for receiving the signals $I_1$ and $Q_1$ correspond to the polarity determining circuit 221 of FIG. 7. Also, multipliers 222I and 222Q correspond to the multiplier 223 of FIG. 3. Further, low-pass filters 223I and 223Q connected to the multipliers 224 and 225 correspond to the low-pass filter 223.

Figure 11:
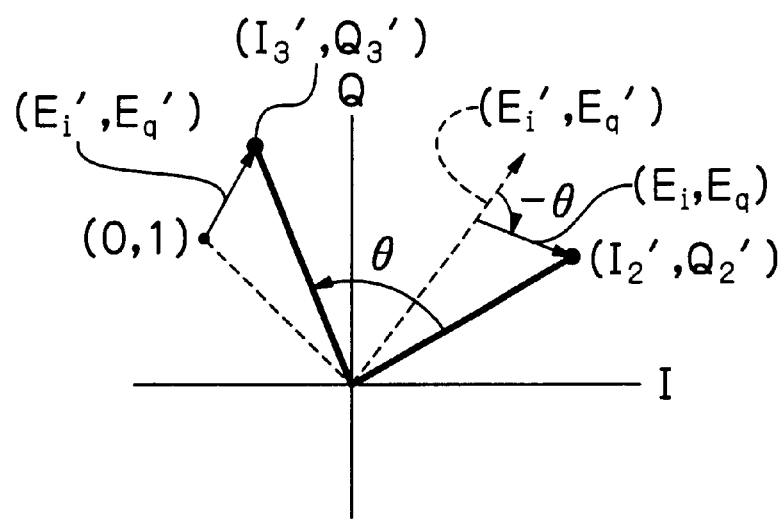
FIG. 11 is a diagram for explaining the complex multiplier of FIG. 10.

Also, in the AGC circuit 23, multipliers 2301, 2302, 2303, 2304, an adder 2305 and a subtracter 2306 are provided to form a complex multiplier 18A similar to that of the complex multiplier 18 of FIG. 6. In this case, the multipliers 2301, 2302, 2303 and 2304 correspond to the multipliers 181, 182, 183 and 184, respectively; the adder 2305 corresponds to the subtracter 185; and the subtracter 2306 corresponds to the adder 186: Therefore, the complex multiplier 18A rotates the error signals $E_i$ and $E_q$ by an opposite value of the phase offset angle θ, i.e., −θ. In more detail, the multipliers 2301 and 2302 multiply the signal $E_i$ by the angle signals cosθ and sin θ, respectively, and the multipliers 2303 and 2304 multiply the signal $E_q$ by the angle signals cosθ and sinθ, respectively. The adder 2305 adds the output signal (=$E_q$ sin θ) of the multiplier 2304 from the output signal (=$E_i$ cos θ) of the multiplier 2301 to obtain $E_i'=E_i \cos θ+E_q \sin θ.$ Also, a subtracter 2306 subtracts the output signal (=$E_q$ cos θ) of the multiplier 2303 from the output signal (=$E_q$ sin θ) of the multiplier 2302 to obtain $E_q'=-E_i \sin θ+E_i \cos θ.$ Thus, the signals $E_i$ and $E_q$ are rotated by an angle −θ to obtain the signals $E_i'$ and $E_q'$, as shown in FIG. 11.

Since the error signals $E_i$ and $E_q$ include an accurate amplitude error in the signals $I_3'$ and $Q_3'$ after the phase rotation by an angle of θ, the error signals $E_i'$ and $E_q'$ include an accurate amplitude error in the signals $I_2'$ and $Q_3'$ before the phase rotation. Thus, as shown in FIG. 8A, the amplitude error included in the signals $I_1$ and $Q_1$ can be completely suppressed in the signals $I_2'$ and $Q_2'$.

In FIG. 10, the polarity signals obtained from the polarity determining circuits 221I and 221Q have to be synchronized with the error signals $E_i'$ and $E_q'$ from the complex multiplier 18A. In order to comply with this requirement, delay circuits 2307I and 2307Q each having a delay time corresponding to a total delay time of the complex multiplier 18, the phase detector 19, the low-pass filter 20 and the numerical control oscillator 21 are provided between the polarity determining circuits 221I and 221Q and the multipliers 222I and 222Q.

In the AGC-type demodulation apparatus of FIG. 8, the error signals $E_i$ and $E_q$ ($E_i'$ and $E_q'$) are brought close to zero, thus carrying out an accurate AGC. If a 16-valued or more modulation system where the distance between signal points is much smaller is adopted, the characteristic of error rates can be further improved.

Figure 12:
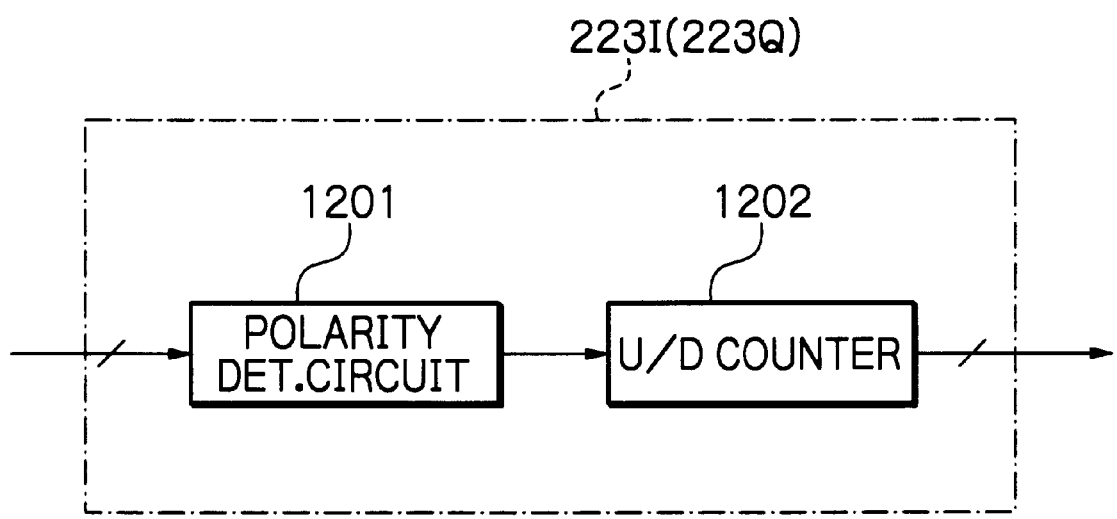
FIG. 12 is a block diagram of the low-pass filter of FIG. 10.

Each of the low-pass filters 223I and 223Q can be constructed by a low-pass filter as illustrated in FIG. 5 or the low-pass filter 20 of FIG. 6. In the case of the low-pass filter 20 of FIG. 6, although the circuit configuration is large, the follow-up control characteristics for the fluctuation of amplitudes of the signals $I_1$ and $Q_1$ and the initial pull-in characteristics can be improved. Also, each of the low-pass filter 223I and 223Q can be constructed by a low-pass filter as illustrated in FIG. 12. That is, in FIG. 12, a polarity determining circuit 1201 and an up/down counter 1202 are provided. When the polarity determined by the polarity determining circuit 1201 is positive, the content of the up/down counter 1202 is counted up. On the other hand, when the polarity determined by the polarity determining circuit 1201 is negative, the content of the up/down counter 1202 is counted down.

Figure 13:
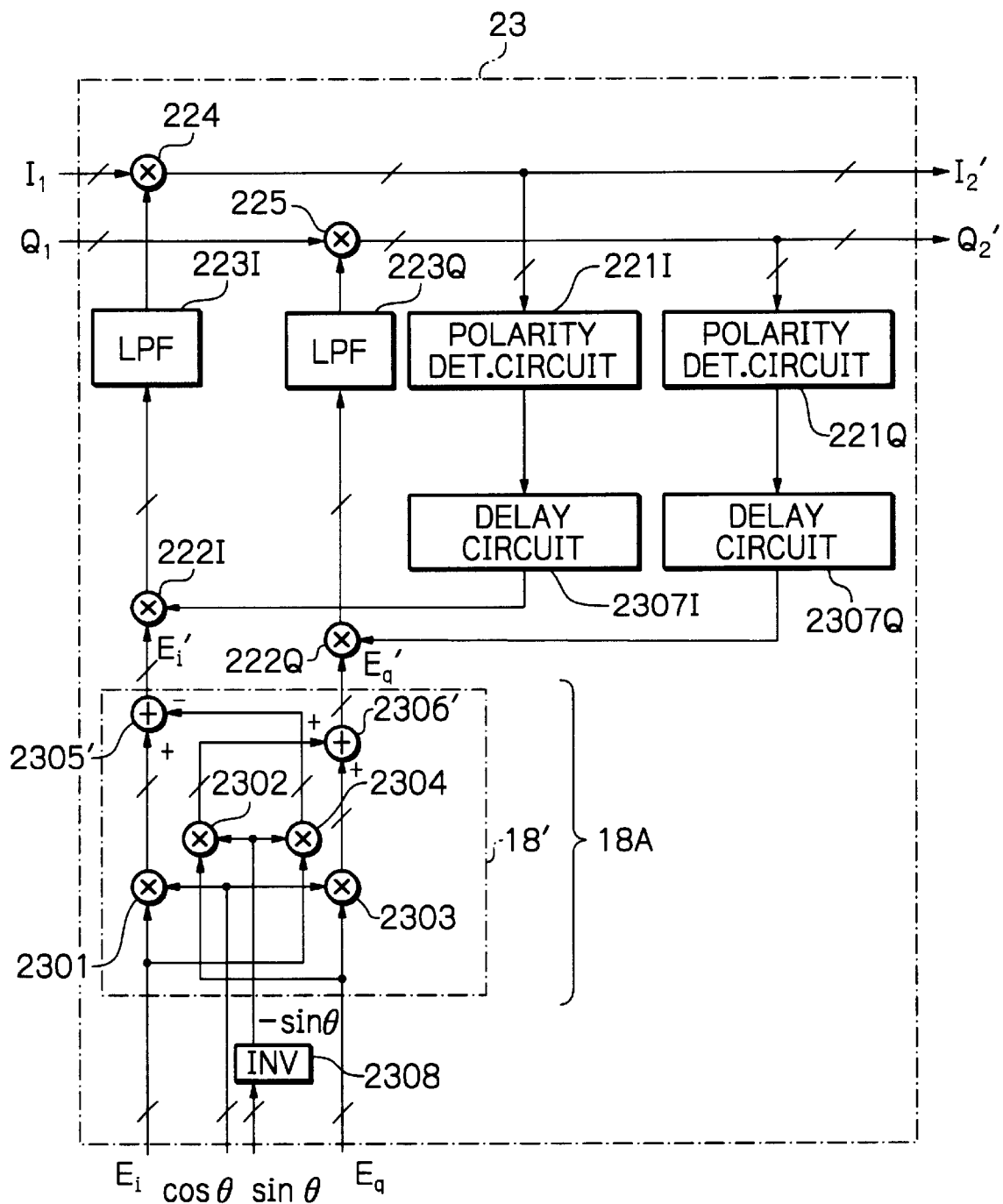
FIG. 13 is a block circuit diagram illustrating a modification of the AGC circuit of FIG. 10.

In FIG. 13, which illustrates a modification of the AGC circuit 23 of FIG. 10, the complex multiplier 18A includes a subtracter 2305' and an adder 2306' instead of the adder 2305 and the subtracter 2306, respectively, of FIG. 10. Also, a polarity inverter 2308 is added to the complexer multiplier 18A. As a result, a complex multiplier 18' formed by the multipliers 2301, 2302, 2303, 2304, the subtracter 2305' and the adder 2306' has the same configuration as the complex multiplier 18. Note that the angle signal sinθ is generally represented by a binary code. Therefore, in order to obtain the angle signal −sinθ, all the bits of the angle signal sin θ are inverted and a value of +1 is added thereto. However, an angle signal −sinθ is approximately obtained by only inverting all the bits of the angle signal sinθ as illustrated in FIG. 13, allowing an error due to the LSB of the angle signal sinθ.

Also, in FIG. 13, as explained above, the complex multiplier 18' has the same configuration as the complex multiplier 18. Therefore, as illustrated in FIG. 14, if switches $SW_1$, $SW_2$, $SW_3$, $SW_4$ and $SW_5$ operated on a time-division basis are added, the complex multipliers 18 and 18' can be constructed by a single complex multiplier, thus decreasing the apparatus in size.

In the above-described embodiment, a semi-coherent detection system and an orthogonal modulation signal such as a PSK or QAM is illustrated; however, a detection system other than the semi-coherent detection system can be used, and a 2-phase PSK (BPSK) or amplitude phase modulation (APSK) signal can be used.

As explained hereinabove, according to the present invention, an accurate automatic gain control is carried out to thereby suppress the amplitude error in the I signal and the Q signal. Also, since only a single AGC circuit is provided, the circuit configuration can be simplified.

What is claimed is:

1. An automatic gain control type demodulation apparatus comprising:

an orthogonal demodulation circuit for receiving an analog input signal to generate a first I-signal and a first Q-signal orthogonal to each other;

an analog/digital converter circuit, connected to said orthogonal demodulation circuit, for performing an analog/digital conversion operation upon said first I-signal and said first Q-signal to generate a second I-signal and a second Q-signal;

an automatic gain control circuit, connected to said analog/digital converter circuit, for suppressing amplitude errors of said second I-signal and said second Q-signal to generate a third I-signal and a third Q-signal;

a complex multiplier, connected to said automatic gain control circuit, for removing frequency and phase offset components of a carrier wave included in said third I-signal and said third Q-signal to generate a fourth I-signal and a fourth Q-signal;

a phase detector, connected to said complex multiplier, for detecting first and second amplitude errors of said fourth I-signal and said fourth Q-signal, respectively, with respect to one normal signal point and calculating a phase error of said fourth I-signal and said fourth Q-signal; and a numerical control oscillator, connected to said phase detector, for converting said phase error into first and second angle signals orthogonal to each other, said automatic gain control circuit being connected to said phase detector and said numerical control oscillator, for controlling the amplitude errors of said second I-signal and said second Q-signal in accordance with said first and second amplitude errors and said first and second angle signals.

2. The apparatus as set forth in claim 1, further comprising a low-pass filter connected between said phase detector and said numerical control oscillator.

3. The apparatus as set forth in claim 1, wherein said orthogonal demodulation circuit comprises:

an oscillator for generating an oscillation signal having a frequency close to a frequency of a carrier wave signal included in said analog input signal;

a $\pi/2$ phase shifter, connected to said oscillator, for shifting said oscillation signal by $\pi/2$; and a first multiplier, connected to said oscillator, for multiplying said analog input signal by said oscillation signal, to generate said first I-signal; and a second multiplier, connected to said $\pi/2$ phase shifter, for multiplying said analog input signal by said $\pi/2$ shifted oscillation signal, to generate said first Q-signal.

4. The apparatus as set forth in claim 3, wherein said analog/digital converter circuit comprises:

a first analog/digital converter, connected to said first multiplier, for generating said second I-signal; and a second analog/digital converter, connected to said second multiplier, for generating said second Q-signal.

5. The apparatus as set forth in claim 1, wherein said complex multiplier comprises:

first and second multipliers, connected to said automatic gain control circuit and said numerical control oscillator, for multiplying said third I-signal and said third Q-signal, respectively, by said first angle signal;

third and fourth multipliers, connected to said automatic gain control circuit and said numerical control oscillator, for multiplying said third I-signal and said third Q-signal, respectively, by said second angle signal;

a subtracter, connected to said first and fourth multipliers, for subtracting an output signal of said fourth multiplier from an output signal of said first multiplier to generate said fourth I-signal; and an adder, connected to said second and third multipliers, for adding an output signal of said third multiplier from an output signal of said second multiplier to generate said fourth Q-signal.

6. The apparatus as set forth in claim 1, wherein said phase detector comprises:

first and second error detectors, connected to said complex multiplier, for detecting said first and second errors in said fourth I-signal and said fourth Q-signal, respectively, with respect to said normal signal point;

a first multiplier, connected to said first complex multiplier and said first error detector, for multiplying said first error by a most significant bit of said fourth I-signal;

a second multiplier, connected to said second complex multiplier and said second error detector, for multiplying said second error by a most significant bit of said fourth Q-signal; and an adder, connected to said first and second multipliers, for adding an output signal of said second multiplier to an output signal of said first multiplier to generate said phase error.

7. The apparatus as set forth in claim 1, wherein said numerical control oscillator comprises:

an integrator for integrating said phase error to generate a frequency error signal; and first and second angle converters, connected to said integrator, for converting said frequency error signal into said first and second angle signals, respectively.

8. The apparatus as set forth in claim 1, wherein said automatic gain control circuit comprises:

first and second multipliers, connected to said phase detector and said numerical control oscillator, for multiplying said first and second amplitude errors, respectively, by said first angle signal;

third and fourth multipliers, connected to said phase detector and said numerical control oscillator, for multiplying said first and second amplitude errors, respectively, by said second angle signal;

an adder, connected to said first and fourth multipliers, for adding an output signal of said fourth multiplier to an output signal of said first multiplier to generate a third amplitude error, a subtracter, connected to said second and third multipliers, for subtracting an output signal of said third multiplier from an output signal of said second multiplier to generate a fourth amplitude error;

first and second polarity determining circuits for determining polarities of said third I-signal and said third Q-signal, respectively, to generate first and second polarity signals, respectively;

first and second delay circuits, connected to said first and second polarity determining circuits, respectively, for delaying said first and second polarity signals;

a fifth multiplier, connected to said adder and said first delay circuit, for multiplying said third amplitude error by a delayed signal of said first polarity signal;

a sixth multiplier, connected to said subtracter and said second delay circuit, for multiplying said fourth amplitude error by a delayed signal of said second polarity signal;

a first low-pass filter, connected to said analog/digital converter circuit and said fifth multiplier, for multiplying said second I-signal by an output signal of said fifth multiplier to generate said third I-signal; and a second low-pass filter, connected to said analog/digital converter circuit and said sixth multiplier, for multiplying said second Q-signal by an output signal of said sixth multiplier to generate said third Q-signal.

9. The apparatus as set forth in claim 8, wherein each of said low-pass filters comprises:

a flip-flop circuit; and an adder, connected to for adding an output signal of said flip-flop circuit to an output signal of said flip-flop circuit to renew a content of said flip-flop.

10. The apparatus as set forth in claim 8, wherein each of said low-pass filters comprises:

a polarity determining circuit for determining a polarity of an input signal; and an up/down counter connected to said polarity determining circuit, said up/down counter being counted up when said polarity is positive, said up/down counter being counted down when said polarity is negative.

11. The apparatus as set forth in claim 1, wherein said automatic gain control circuit comprises:

an inverter connected to said numerical control oscillator, for inverting said second angle signal;

first and second multipliers, connected to said phase detector and said numerical control oscillator, for multiplying said first and second amplitude errors, respectively, by said first angle signal;

third and fourth multipliers, connected to said phase detector and said inverter, for multiplying said first and second amplitude errors, respectively, by an inverted signal said second angle signal;

a subtracter, connected to said first and fourth multipliers, for subtracting an output signal of said fourth multiplier from an output signal of said first multiplier to generate a third amplitude error, an adder, connected to said second and third multipliers, for adding an output signal of said third multiplier to an output signal of said second multiplier to generate a fourth amplitude error;

first and second polarity determining circuits for determining polarities of said third I-signal and said third Q-signal, respectively, to generate first and second polarity signals, respectively;

first and second delay circuits, connected to said first and second polarity determining circuits, respectively, for delaying said first and second polarity signals;

a fifth multiplier, connected to said adder and said first delay circuit, for multiplying said third amplitude error by a delayed signal of said first polarity signal;

a sixth multiplier, connected to said subtracter and said second delay circuit, for multiplying said fourth amplitude error by a delayed signal of said second polarity signal;

a first low-pass filter, connected to said analog/digital converter circuit and said fifth multiplier, for multiplying said second I-signal by an output signal of said fifth multiplier to generate said third I-signal; and a second low-pass filter, connected to said analog/digital converter circuit and said sixth multiplier, for multiplying said second Q-signal by an output signal of said sixth multiplier to generate said third Q-signal.

12. The apparatus as set forth in claim 11, wherein each of said low-pass filters comprises:

a polarity determining circuit for determining a polarity of an input signal;

a flip-flop circuit; and an adder, connected between said polarity determining circuit and said flip-flop circuit, for adding an output signal of said polarity determining circuit to an output signal of said flip-flop circuit to renew a content of said flip-flop.

13. The apparatus as set forth in claim 11, wherein each of said low-pass filters comprises:

a polarity determining circuit for determining a polarity of an input signal; and an up/down counter connected to said polarity determining circuit, said up/down counter being counted up when said polarity is positive, said up/down counter being counted down when said polarity is negative.

14. The apparatus as set forth in claim 11, wherein said first, second, third and fourth multipliers, said subtracter and said adder form said complex multiplier, said complex multiplier being operated on a time-division basis for said automatic gain control circuit.

15. The apparatus as set forth in claim 2, wherein said low-pass filter comprises a secondary lag lead filter.

* * * * *